Aug. 4, 1970 A. MOORE 3,523,253

COUPLING NETWORK

Filed April 15, 1966

INVENTOR
Alfred Moore
BY Hofgren, Wegner, Allen, Stellman & McCord
ATTORNEYS

United States Patent Office 3,523,253
Patented Aug. 4, 1970

3,523,253
COUPLING NETWORK

Alfred Moore, Jeffersonville, Ind., assignor, by mesne assignments, to Electronic Memories & Magnetics Corporation, Hawthorne, Calif., a corporation of Delaware Filed Apr. 15, 1966, Ser. No. 542,955
Int. Cl. H03b *1/00;* H03k *3/26*
U.S. Cl. 328—165 9 Claims

ABSTRACT OF THE DISCLOSURE

A coupling network which enhances the desired signal while discriminating against undesirable higher frequency components. A signal component is clipped by a Zener diode and integrated by a series connected resistor and capacitor shunted across the Zener diode. A second diode shunts the resistor to provide rapid discharge of the capacitor. The charging of the capacitor produces a signal which actuates a switching device.

This invention relates to a coupling network for a switching device, and more particularly to a network for enhancing a desired electrical signal while discriminating against interfering components which could trigger the switching device.

Various switching devices, such as threshold trigger circuits, are actuated when a signal exceeds a predetermined minimum amplitude. In such circuits, undesirable noise, transient and ripple components may accompany the signal and produce false triggering of the switching device. This problem is particularly acute in metal detectors, in which a weak alternating signal indicating the presence of metal may be masked by higher frequency noise and ripple components. The present invention has particular utility when used in a metal detector circuit, and will be disclosed in such an environment, although the invention is not to be limited thereto.

One object of the invention is the provision of a coupling network which enhances the desired signal while discriminating against undesirable higher frequency components.

Another object is a coupling network which clips the input of the signal component and undesirable components to eliminate DC drift and to equalize the amplitudes of ripple, transient and signal components. The clipped components are time integrated to enhance the signal components.

One feature of the invention is a coupling network having the above objects and which is composed of only passive elements, such as resistors, capacitors, and diodes.

Another feature is a coupling network which includes a Zener diode for reducing DC drift, and a series connected resistor and capacitor shunting the Zener diode for integrating the signal clipped by the diode. A second diode shunts the resistor to cause different charge and discharge rates across the capacitor. The charging of the capacitor produces a signal which actuates a switching device. The forward voltage drop across the second diode is preferably approximately equal to the forward voltage drop across the Zener diode.

Further features and advantages of the invention will be apparent from the following specification and from the drawings, in which.

Figures 1, 2, 3, 4:
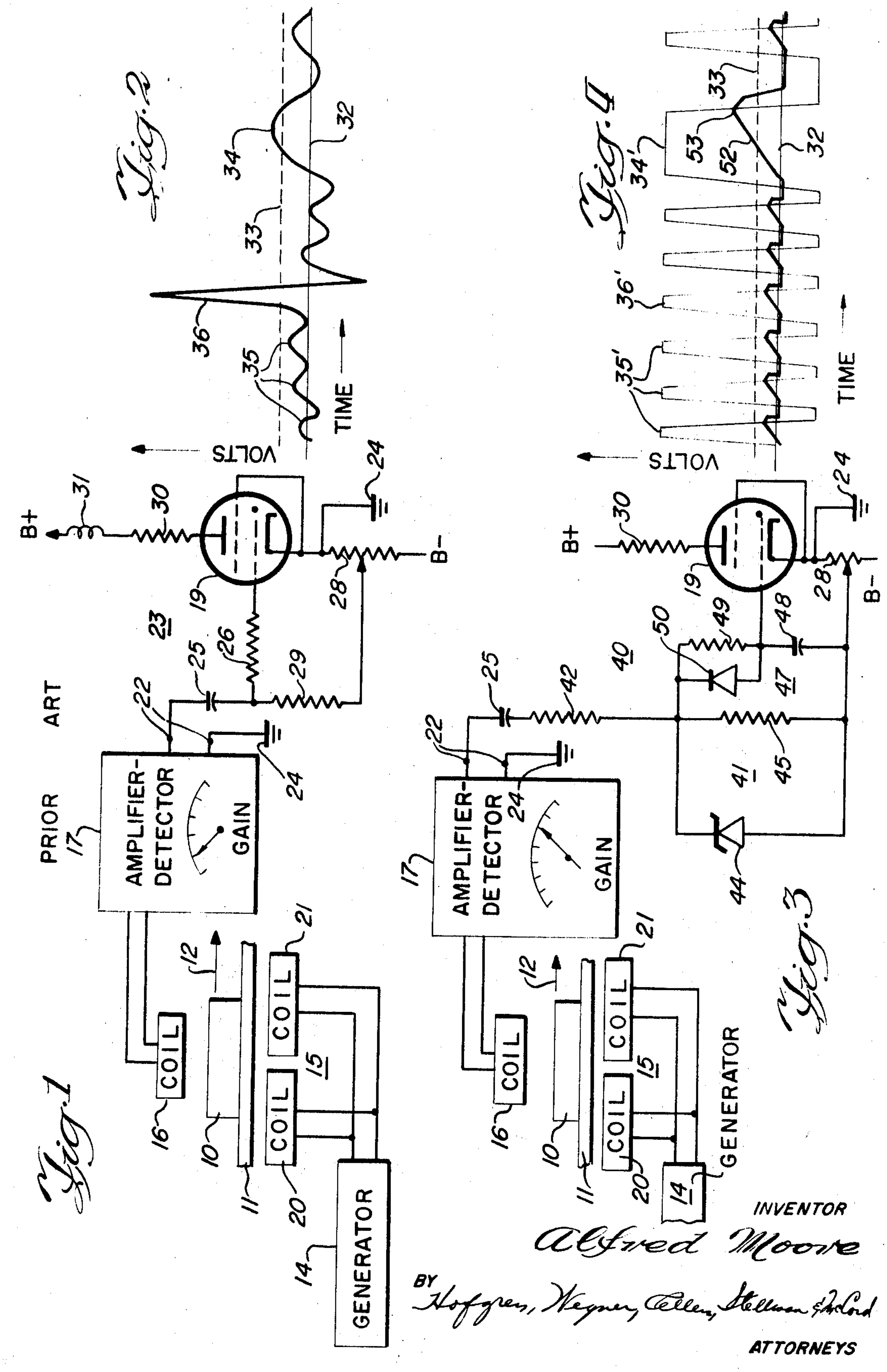
FIG. 1 is a partly block and partly schematic diagram of a typical prior known metal detector.
FIG. 2 is a diagram of the waveform coupled to the input of the switching device in FIG. 1.
FIG. 3 is a partly block and partly schematic diagram of the present invention.
FIG. 4 is a diagram of the waveforms found in FIG. 3.

While an illustrative embodiment of the invention is shown in the drawings and will be disclosed in detail herein, the invention is susceptible of embodiment in several different forms and the present disclosure is to be considered as an exemplification of the principles of the invention and is not intended to limit the invention to the embodiment illustrated. Throughout the specification, values and type designations will be given in order to disclose a complete, operative embodiment. However, these values and type designations are not critical unless specifically so stated. The scope of the invention will be pointed out in the appended claims.

In FIG. 1, a typical prior known metal detector is illustrated for the purpose of explaining the problem overcome by the present invention. The metal detector is illustrated in a typical application where the presence of conductive material, such as metallic particles, contained in packaged articles 10 must be checked. The packages 10 contain generally nonconductive material, as food stuffs, which are carried on a conveyor 11 in the direction of the arrow 12. A generator 14, which may provide a sine wave signal at a suitable frequency, as 50 kilocycles, has an output connected with the input of a generator coil assembly 15. A detector coil assembly 16 has an output connected with the input of an amplifier and detector 17. The two coil assemblies considered together form a balanced coil means which generates a sensing field that has a balanced condition with respect to the detector coil in the absence of a conductive particle, but which becomes unbalanced establishing an electrical signal in the detector coil assembly 16, as a conductive particle passes two coil assemblies. This signal is amplified and detected at 17, and used to trigger a switching device, such as a thyratron 19. The output of the thyratron may be utilized to sound an alarm, to eject a faulty article 10 from the conveyor, or to perform some other desired action as the result of the sensing of the conductive material.

The generator coil assembly 15 may be formed from two coil portions 20 and 21 which are driven by signals from generator 14 which are 180° out of phase. The two coil portions are preferably spaced from each other in the direction of movement 12 of conveyor 11, with the single coil portion 16 spaced in a plane half-way between the generating coil portions. Such a coil assembly is disclosed in detail in the copending application of Lyndon J. Albrecht, "Metal Detector," Ser. No. 344,663, filed Feb. 18, 1965, and assigned to the assignee of this application. As disclosed in that application, to which reference may be made for a more detailed description, in the absence of a conductive object in the sensing field, coil portions 20 and 21 have induced therein only a small voltage in the detector coil assembly 16. When a conductive particle passes through the sensing field between the two coil assemblies, it disrupts the balanced condition, causing a substantial signal to appear at the input of stage 17. This signal is amplified and detected by stage 17, and is available at output terminals 22.

Thyratron 19 is coupled to output terminals 22 by a coupling network 23, such as the one shown in FIG. 1. For this purpose, one output terminal 22 is directly connected to a source of reference potential or ground 24. The other terminal 22 is coupled through a DC blocking capacitor 25 and a 1.5 megohm current limiting resistor 26 to the control grid of thyratron 19. Thyratron 19 is of the negative control type, as a 5727, which is triggered when its control grid is at approximately —2.0 volts with respect to its cathode, which is directly connected to ground 24. A 3 kilohm variable potentiometer 28 is connected between a source of negative potential, or B—, and ground 24. The output tap on potentiometer 28 is coupled through a 100 kilohm resistor 29 to the junction between capacitor 25 and resistor 26. Potentiometer 28 is adjusted to bias thyratron 19 to its nonconducting state, as by coupling −3.0 volts to the control grid. The plate of the thyratron is coupled through a 7500 ohm load resistor 30 and a relay coil 31 to a suitable source of positive potential, or B+.

A typical signal on the control grid of thyratron 19 is illustrated in FIG. 2. This signal varies with reference to the DC bias level 32 on the control grid, as −3.0 volts. When the signal exceeds the critical voltage level 33, or −2.0 volts, thyratron 19 will fire, causing current to flow through relay coil 31 to actuate any desired control function.

When a metal particle passes the coil assembly, an alternating component 34 is generated which exceeds the critical level 33, thereby activating thyratron 19. Unfortunately, component 34 is often accompanied by higher frequency components which may exceed the critical level, such as ripple 35 from the power supply for the metal detector, and high impulse transients 36 which often ride in through the external power line for the metal detector. As is apparent from the drawing, the transient 36 illustrated has an amplitude which exceeds the critical level 33, and thus will trigger thyratron 19 although no metal particle is present.

False triggering can also be produced because the amplitudes of the ripple components 35 may vary with time, as illustrated by the upward slope of the ripple in FIG. 2. Since thyratron 19 is capacity coupled through capacitor 25 to the source of the signal, i.e., amplifier-detector stage 17, the varying amplitude ripple components charge capacitor 25, creating a small DC voltage which adds to bias level 32, thus changing the signal level at which the thyratron is activated. Such DC drift may accumulate sufficiently to allow the small ripple components 35 to exceed the fixed critical gating level 33, thus triggering thyratron 19.

Although a particular coil assembly and thyratron circuit have been illustrated in FIG. 1, these circuits are merely illustrative of circuits in which a waveform such as illustrated in FIG. 2 is used to trigger a signal utilization means which is activated by a signal of predetermined amplitude.

In FIG. 3, a coupling network 40 in accordance with the present invention is illustrated which replaces the coupling network 23 in FIG. 1. The remaining portion of FIG. 3 is identical with FIG. 1. The operation of coupling network 40 will be described in conjunction with the waveforms illustrated in FIG. 4, which show voltages across various of the circuit elements in FIG. 3.

A clipping or limiting means 41 is coupled through a 50 kilohm resistor 42 to capacitor 25. Clipping means 41 includes a shunted Zener diode 44 and 100 kilohm resistor 45, which are connected through potentiometer 28 to ground 24. Zener diode 44 has a 4.7 volt drop thereacross when conducting in the back direction, i.e., when the voltage at resistor 42 is positive. An integrating network 47, coupled directly across limiting means 41, is formed from a capacitor 48, as .1 microfarads, coupled between the control grid of thyratron 19 and the −3.0 volt bias from potentiometer 28. Capacitor 48 is connected in series with a 1 megohm resistor 49 shunted by a semiconductor diode 50.

In operation, the gain of stage 17 of FIG. 2 is higher than the gain of stage 17 of FIG. 1. The output signal across terminals 22 therefore resembles the waveform illustrated in FIG. 2, but has a much larger amplitude. This signal is clipped by Zener diode 44, producing a limited amplitude signal thereacross indicated by the primed numerals in FIG. 4. The gain of stage 17 and the forward and backward voltage drop across Zener diode 44 are chosen so that the metal signal 34′ and some of the ripple components 35′ are clipped in both the positive and negative going directions. The positive going clipped waveforms in FIG. 4 correspond to the backward voltage drop across Zener diode 44, while the lower amplitude negative going signals in FIG. 4 correspond to the forward voltage drop across Zener diode 44. Since all signals are clipped at the same amplitude, DC drift is eliminated, because the ripple components do not change in amplitude with time to vary the charge accumulated on capacitor 25.

The clipped amplitude components are time integrated by network 47, producing the integrated signal indicated by the waveform 52 in FIG. 4. Diode 50 is poled to block the positive going clipped components, which therefore are coupled through the large resistor 49 to capacitor 48, establishing a long time constant network for positive going signals. As a result, the positive going signals have a slow rise time, the peak amplitude of which is proportional to the width of the clipped signal. The clipped metal signal 34′, having a wider width than the higher frequency ripple and transient components, is integrated by capacitor 48 and produces an integrated signal having a peak at point 53, which exceeds the critical level 33, thus actuating thyratron 19. When the clipped components go negative, capacitor 48 quickly discharges across resistor 45 because resistor 49 is at this time shunted by the forward conducting diode 50. The previously accumulated charge thus rapidly dissipates, producing a fast fall time.

Diode 50, which insures that each clipped component is separately integrated, preferably has approximately the same forward voltage drop thereacross as the forward voltage drop of Zener diode 44, to insure that positive integration starts at approximately the bias voltage 32. Since diode 50 is back biased when the thyratron 19 is fired, the high value of resistor 49 is effectively connected in circuit to limit grid current flow.

While each of the circuit elements illustrated produces a desirable result, certain of the elements can be eliminated with the resulting elimination of their feature. For example, in some applications the quick discharge of capacitor 48 may not be critical, and diode 50 may be eliminated. If desired, Zener diode 44 could be replaced with an ordinary semiconductor diode poled in the opposite direction. In such a circuit, the forward voltage drop across the diode would provide the same function as was provided by the backward voltage drop across Zener diode 44. Other combinations can be made without departing from the spirit of the invention.

I claim:

1. In a circuit including a source of signals occasionally having an alternating component of minimum time duration and at other times having undesirable higher frequency components with amplitudes which may exceed the amplitude of said alternating component and a signal utilization means actuated by a signal of a predetermined amplitude, a coupling network for discriminating against the undesirable components, comprising: clipping means coupled to said source for limiting the amplitudes of said components to a maximum level; and means coupled between said limiting means and said utilization means for time integrating the amplitude limited components to produce signals having amplitudes proportional to the time duration of the amplitude limited components, including discharge means independent of said signal utilization means for dissipating the produced signals at a rate to prevent the amplitude thereof from reaching said predetermined amplitude except when the amplitude limited component has a time duration equal to or exceeding said minimum time duration, whereby said signal utilization means is actuated when said alternating component is present and is not actuated when said undesirable components are present.

2. The network of claim 1 wherein said limiting means includes a semiconductor junction having a voltage drop thereacross corresponding to said maximum level.

3. The network of claim 1 wherein said signal source includes amplifier means for amplifying the amplitudes of said alternating component and said undesirable components, said amplifier having a gain sufficient to cause substantially all components to have amplitudes exceeding the amplitude of said maximum level, and said clipping means clips both positive and negative going portions of all of the components.

4. The network of claim 3 wherein said limiting means includes a Zener diode having a backward voltage drop greater than its forward voltage drop, said Zener diode being poled to cause the backward voltage drop to be integrated by said integrating means.

5. The network of claim 1 wherein said integrating means includes capacitance means, said discharge means includes resistor means in series with said capacitance means and a diode shunting the resistor means, said diode causing the charge rate of the capacitance means to be different from the discharge rate.

6. The network of claim 1 in series with a capacitor connected between said signal source and said utilization means, wherein said limiting means includes a semiconductor junction in shunt with first resistance means for limiting the amplitudes of the alternating component and of undesirable components, said integrating means including series connected capacitance means and second resistance means forming a part of said discharge means and in shunt with said first resistance means to time integrate the amplitude limited components across the semiconductor junction.

7. The network of claim 6 wherein the first semiconductor junction exhibits clipping for both positive and negative going components.

8. The network of claim 6 wherein said discharge means includes a second semiconductor junction in shunt with said second resistance means for causing different charge and discharge rates across said capacitance means.

9. The network of claim 8 wherein the voltage drop across the second semiconductor junction is on the same order as the voltage drop in the corresponding direction across the first named semiconductor junction.

References Cited

UNITED STATES PATENTS

| | | | |
|---|---|---|---|
| 2,829,282 | 4/1958 | Hughes et al. | 307—318 |
| 2,874,284 | 2/1959 | Conger | 328—165 |
| 2,922,880 | 1/1960 | Elam | 328—5 |
| 3,018,384 | 1/1962 | Zrubek | 307—293 |

DONALD D. FORRER, Primary Examiner

B. P. DAVIS, Assistant Examiner

U.S. Cl. X.R.

307—318; 328—127